United States Patent
Watts et al.

[15] 3,675,703
[45] July 11, 1972

[54] BIAS-BELTED PNEUMATIC TIRE

[72] Inventors: George T. Watts, North Canton; Robert W. Yeager, Akron, both of Ohio

[73] Assignee: The Goodyear Tire & Rubber Company, Akron, Ohio

[22] Filed: Sept. 23, 1970

[21] Appl. No.: 74,574

[52] U.S. Cl............................................................152/361
[51] Int. Cl............................................................B60c 9/18
[58] Field of Search..........................152/354, 355, 356, 361

[56] References Cited

UNITED STATES PATENTS

| | | |
|---|---|---|
| 3,242,965 | 3/1966 | Mirtain....................................152/361 |
| 2,939,502 | 6/1960 | Hindin et al............................152/352 |
| 3,131,744 | 5/1964 | Boussu et al..........................152/361 |

Primary Examiner—Arthur L. La Point
Assistant Examiner—George H. Libman
Attorney—F. W. Brunner and Michael L. Gill

[57] ABSTRACT

A bias-belted pneumatic tire having a pair of belt plies, the radially inner ply of said belt plies having a lower modulus of elasticity than the radially outer ply of said pair of belt plies.

The foregoing abstract is not to be taken as limiting the invention of this application, and in order to understand the full nature and extent of the technical disclosure of this application, reference must be made to the accompanying drawing and the following detailed description.

9 Claims, 1 Drawing Figure

PATENTED JUL 11 1972
3,675,703
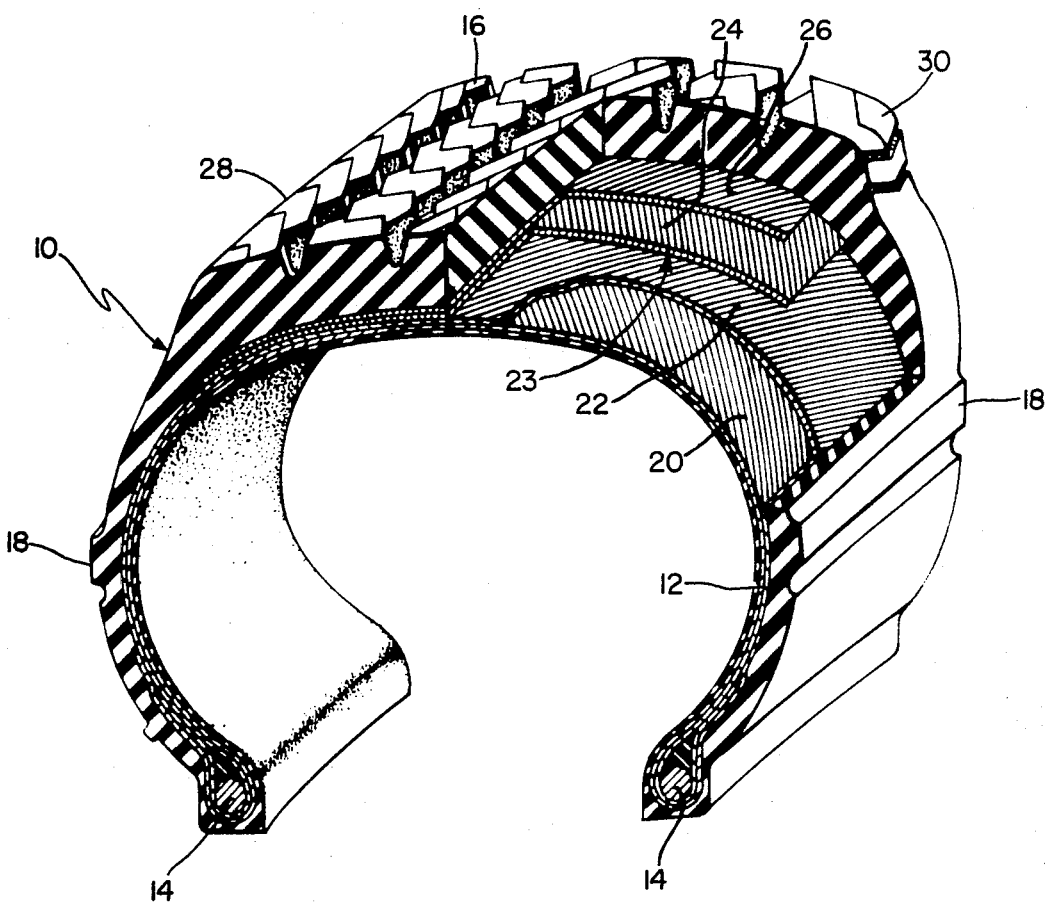
INVENTORS
GEORGE T. WATTS
ROBERT W. YEAGER
BY *Michael L. Gill*
ATTORNEY

BIAS-BELTED PNEUMATIC TIRE

This invention relates to pneumatic tires and more particularly to a bias-ply tire having a circumferentially restricting belt disposed about the bias plies and beneath the tread.

An object of this invention is to provide a bias-belted pneumatic tire having improved ride and durability particularly in the area of the tread. Other objects will be in part apparent and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawing:

FIG. 1 is a sectional perspective view of a portion of a tire constructed in accordance with this invention.

With reference to the drawing there is illustrated a tire 10 having a pair of annular beads 14 and a carcass 12 extending from bead to bead. A tread portion 16 is disposed radially outwardly of the carcass 12 and extends circumferentially thereabout. A sidewall 18 extends from each bead 14 to the tread 16. The carcass 12 comprises a pair of carcass plies 20 and 22 which extend circumferentially of the tire and from one bead 14 to the other bead 14. A belt or circumferentially restricting member 23 extends circumferentially about the carcass 12 and is disposed beneath the thread 16. The belt 23 comprises a pair of belt plies 24 and 26.

Each carcass ply 20 and 22 comprises a plurality of parallel tire cords. The plies 20 and 22 are bias plies in that their individual tire cords form an angle of between 20° and 65° with the mid-circumferential centerplane of the tire at the mid-circumferential centerplane. The mid-circumferential centerplane is a plane which is perpendicular to the rotational axis of the tire and is disposed midway between the lateral edge or shoulders 28 and 30 of the tread 16. The acute angle that the cords in a particular ply form with the mid-circumferential centerplane at the mid-circumferential centerplane is the "-cord angle" of that particular ply. The carcass plies 20 and 22 have their cords extending at opposite angles with respect to the mid-circumferential centerplane, as is standard in the construction of bias-ply tires.

The belt plies 24 and 26 also each comprises a plurality of parallel tire cords. These cords also form an acute angle with respect to the mid-circumferential centerplane and extend at opposite angles with respect thereto. The belt plies 24 and 26 serve to restrict the outer diameter of the tread portion. In other words, the outside diameter of a tire 10 having belt plies is less when the tire is inflated than the outside diameter of the tire 10 would have when it is inflated were there no belt plies present. In order to provide sufficient circumferential restriction, the cord angle of the belt plies should be less than the cord angle of the carcass plies, and it is preferred that the differences between the belt ply cord angle and the carcass ply cord angle be at least 2° but not more than 45°. For optimum results this differential in cord angle should be at least 4° and not greater than 10°. The belt plies extend laterally of the tire substantially from one shoulder 28 to the other shoulder 30.

In accordance with the present invention, the outer belt ply 26 has a modulus of elasticity which is higher than the modulus of elasticity of the inner belt ply 24, and the inner belt ply 24 has a modulus of elasticity which is at least as great as the modulus of elasticity of the radially outermost carcass ply 22. The modulus of elasticity of the radially outermost belt ply is at least 30 grams per denier greater than the modulus of elasticity of the radially outermost carcass ply.

For purposes of this invention the "modulus of elasticity of a ply" will be equal to the modulus of elasticity of the individual cords in that particular ply. Also for purposes of this invention, the modulus of elasticity of a tire cord is the slope of the initial straight portion of the stress-strain curve of the tire cord with the cord in the condition just prior to calendering. The modulus of elasticity is determined as specified in the 1969 edition of ASTM Specification, Part 24, Specification No. D885, Section 11.10.

In the particular embodiment illustrated, the carcass plies 20 and 22 are comprised of polyester tire cords having a cord angle of approximately 34°. The radially innermost belt ply 24 comprises rayon tire cords while the radially outermost belt ply 26 comprises fiberglass tire cords. The cord angle of each belt ply 24 and 26 is approximately 25°. The modulus of elasticity of the polyester cords in both the carcass plies 20 and 22 is approximately 60 grams per denier. The modulus of elasticity of the rayon radially innermost belt ply is approximately 90 grams per denier and the modulus of elasticity of the radially outermost belt ply 26 is approximately 144 grams per denier.

The belt ply 24 is disposed immediately radially outwardly of the radially outer carcass ply 22 and does not have any cushion or gum strip therebetween. That is to say the only rubber between the outer carcass ply 22 and the inner belt ply 24 is the normal rubber stock which is deposited on the tire cord fabric during the calendering operation. The radially outermost belt ply 26 is immediately radially outwardly of the first belt ply and again there is no cushion stock or gum strip of rubber disposed therebetween. In the particular embodiment illustrated the inner belt ply 24 is slightly wider than the outer belt ply 26 and extends laterally of the tread a short distance beyond both lateral edges of the belt ply 26.

While in the specific examples illustrated the carcass plies 20 and 22 are polyester, the innermost belt ply 24 is rayon and the radially outermost belt ply 26 is fiberglass, they need not be these specific materials. The important thing is that the outer belt ply have a higher modulus of elasticity than the inner belt ply and that the inner belt ply have a modulus of elasticity at least as great as the radially outermost carcass ply. It is preferred that the radially outermost belt ply be selected from the group consisting of fiberglass, wire and rayon, and that the radially innermost belt ply be selected from the group consisting of polyester, nylon and rayon. While the modulus of elasticity of the radially innermost belt ply should be at least as high as the modulus of elasticity of the radially outermost carcass ply, it is preferred that it be greater than the modulus of elasticity of the radially outermost carcass ply by an amount equal to between 30 and 60 percent of the difference between the modulus of elasticity of the radially outermost carcass ply and the modulus of elasticity of the radially outermost belt ply. For optimum results this amount should be equal to about 50 percent of the difference between the modulus of elasticity of the radially outermost carcass ply and the modulus of elasticity of the radially outermost belt ply.

While in the specific embodiment illustrated, there are only two carcass plies and only two belt plies, it would be understood by those skilled in the art that more carcass plies could be added and more belt plies could be added. In the event that more belt plies are added, the radially innermost belt ply should have the lowest modulus of elasticity of all the belt plies and the radially outermost belt play should have the highest modulus of elasticity of all belt plies. The modulus of elasticity of each belt ply should be at least as great as each ply (whether a carcass ply or a belt ply) that is disposed radially inwardly with respect to said each belt ply.

While certain representative embodiments and details have been shown for the purpose of illustrating the invention, it will be apparent to those skilled in this at that various changes and modifications may be made therein without departing from the spirit or scope of the invention.

What is claimed is:

1. A bias-belted pneumatic tire including a tread portion, a pair of beads, a carcass having plies of tire cord fabric extending circumferentially about said tire and from bead to bead, and a belt disposed beneath said tread and extending circumferentially about said carcass, said belt comprising plies of tire cord fabric, the radially innermost ply of said belt plies having a modulus of elasticity which is greater than the modulus of elasticity of the radially outermost carcass ply by an amount equal to between 30 and 60 percent of the difference between the modulus of elasticity of the radially outermost carcass ply and the modulus of elasticity of the radially outermost belt ply.

2. A tire as claimed in claim 1, wherein the cord angle of said belt plies is at least 5° less than the cord angle of said plies in said carcass.

3. A tire as claimed in claim 2, wherein said belt contains only two plies and said carcass contains only two plies.

4. A tire as claimed in claim 1, wherein said the modulus of elasticity of the radially outermost belt ply is at least 30 grams per denier greater than the modulus of elasticity of the radially outermost carcass ply.

5. A tire as claimed in claim 3, wherein the modulus of elasticity of the radially outermost belt ply is at least 30 grams per denier greater than the modulus of elasticity of the radially outermost carcass ply.

6. A tire as claimed in claim 4, wherein each belt ply has a modulus of elasticity which is at least as great as the modulus of elasticity of every ply that is disposed radially inwardly with respect to said each belt ply.

7. A tire as claimed in claim 1, in which the radially innermost belt ply is selected from the group consisting of polyester, nylon and rayon, and the radially outermost belt ply is selected from the group consisting of fiberglass, wire and rayon.

8. A tire as claimed in claim 7, wherein the modulus of elasticity of the radially innermost belt ply is greater than the modulus of elasticity of the radially outermost carcass ply by an amount equal to about 50 percent of the difference between the modulus of elasticity of the radially outermost carcass ply and the modulus of elasticity of the radially outermost belt ply.

9. A tire as claimed in claim 4, wherein the cord angle of said belt plies is at least 2° less than the cord angle of said plies in said carcass.

* * * * *